(12) United States Patent
Oberson et al.

(10) Patent No.: US 12,379,693 B2
(45) Date of Patent: Aug. 5, 2025

(54) METHOD FOR MANUFACTURING A TIMEPIECE COMPONENT

(71) Applicant: The Swatch Group Research and Development Ltd, Marin (CH)

(72) Inventors: Loïc Oberson, Morges (CH);
Alexandre Netuschill, Le Cerneux-Péquignot (CH); Stéphane Lauper, Cortaillod (CH); Gregory Kissling, La Neuveville (CH); Stewes Bourban, Chabrey (CH); Pierre Sauret, Les Hauts-Geneveys (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 18/299,371

(22) Filed: Apr. 12, 2023

(65) Prior Publication Data
US 2024/0019814 A1    Jan. 18, 2024

(30) Foreign Application Priority Data
Jul. 13, 2022 (EP) .................................. 22184754

(51) Int. Cl.
*G04B 37/12*    (2006.01)
*B23P 15/00*    (2006.01)
(Continued)

(52) U.S. Cl.
CPC .............. *G04B 37/22* (2013.01); *B23P 15/00* (2013.01); *G04D 3/0053* (2013.01);
(Continued)

(58) Field of Classification Search
CPC ..................... Y10T 29/49588; Y10T 29/49579
See application file for complete search history.

(56) References Cited

U.S. PATENT DOCUMENTS

| 3,863,439 A | * | 2/1975 | Kasai | ..................... G04B 19/12 368/232 |
| 4,624,815 A | * | 11/1986 | Moufarrege | ............ B29C 39/10 D7/564 |

(Continued)

FOREIGN PATENT DOCUMENTS

| CH | 707351 A2 | 6/2014 |
| EP | 0294661 B1 | 11/1990 |

(Continued)

OTHER PUBLICATIONS

English Machine Language of CH707351A2, Lauper et al. (Year: 2014).*

(Continued)

*Primary Examiner* — Sarang Afzali
(74) *Attorney, Agent, or Firm* — Sughrue Mion, PLLC

(57) ABSTRACT

A method for manufacturing a timepiece component. The method includes: providing a timepiece component (1); breaking the timepiece component (1) into a plurality of pieces (10); and depositing the pieces (10) on a support (2) and creating a desired pattern to be reassembled having interstices (1). The support (2) is then transferred into a mould and a preform (3) is placed on the pieces (10). The assembly is then heated to a temperature higher than the vitreous transition temperature of the preform (3) and a force is applied on the preform to fill the interstices (11) and obtain a reassembled timepiece component (1'). The assembly is then cooled below the vitreous transition temperature of the preform (3) to form the reassembled timepiece component (1') whereupon the timepiece component (1') is machined to the required dimensions.

11 Claims, 1 Drawing Sheet

(51) Int. Cl.
*G04B 37/22* (2006.01)
*G04D 3/00* (2006.01)

(52) U.S. Cl.
CPC ...... *G04D 3/0097* (2013.01); *Y10T 29/49579* (2015.01); *Y10T 29/49588* (2015.01)

(56) References Cited

U.S. PATENT DOCUMENTS

| | | | | |
|---|---|---|---|---|
| 6,171,989 | B1* | 1/2001 | Yoshida | A44C 27/003 |
| | | | | 501/102 |
| 8,999,217 | B2* | 4/2015 | Winkler | G04B 37/22 |
| | | | | 264/264 |
| 9,066,564 | B2* | 6/2015 | Tsukamoto | G04B 37/00 |
| 9,084,457 | B2* | 7/2015 | Rizzo | A44C 17/04 |
| 10,849,246 | B2* | 11/2020 | Hooten | H05K 5/03 |
| 11,906,932 | B2* | 2/2024 | Jeanrenaud | G04D 3/0048 |
| 2007/0242467 | A1* | 10/2007 | Zheng | F21V 3/04 |
| | | | | 156/60 |
| 2007/0245682 | A1* | 10/2007 | Zheng | B29C 70/58 |
| | | | | 52/745.19 |
| 2014/0174125 | A1 | 6/2014 | Lauper et al. | |
| 2017/0248922 | A1* | 8/2017 | Hynecek | A45C 11/12 |
| 2021/0046548 | A1 | 2/2021 | Le Loarer et al. | |
| 2021/0333760 | A1* | 10/2021 | Etienvre | C04B 35/83 |

FOREIGN PATENT DOCUMENTS

| | | |
|---|---|---|
| JP | S57-26078 U | 2/1982 |
| JP | 2014-121609 A | 7/2014 |
| JP | 2021-31770 A | 3/2021 |
| KR | 10-2009-0116995 A | 11/2009 |

OTHER PUBLICATIONS

European Search Repot for Application No. 22 18 4754 dated Nov. 1, 2022.

* cited by examiner

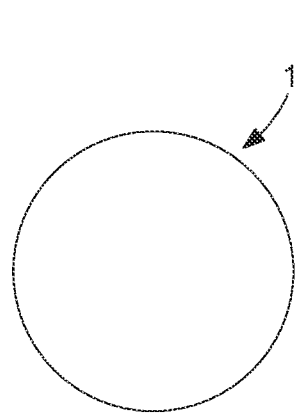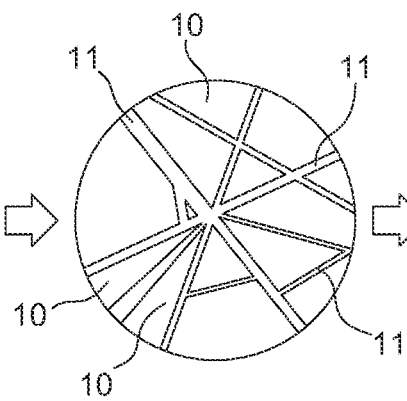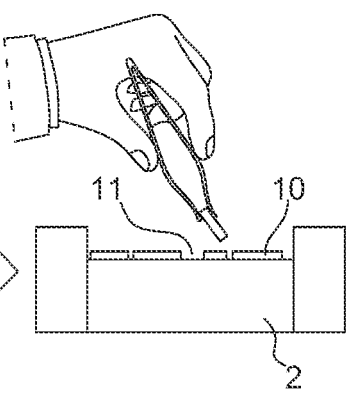
FIG. 1 (a)    FIG. 1 (b)    FIG. 1 (c)
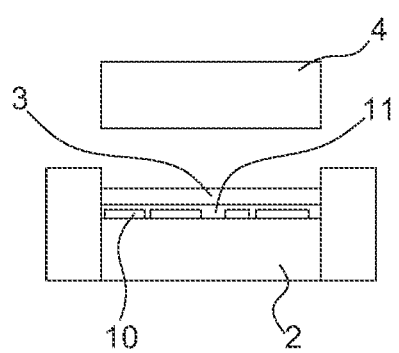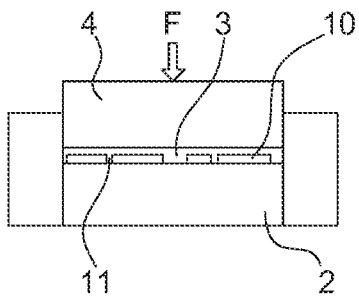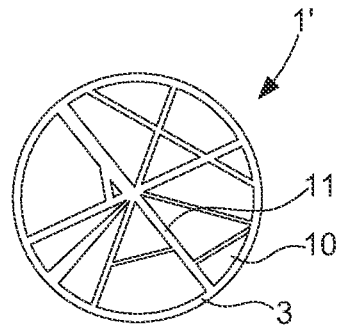
FIG. 1 (d)    FIG. 1 (e)    FIG. 1 (f)
FIG. 2
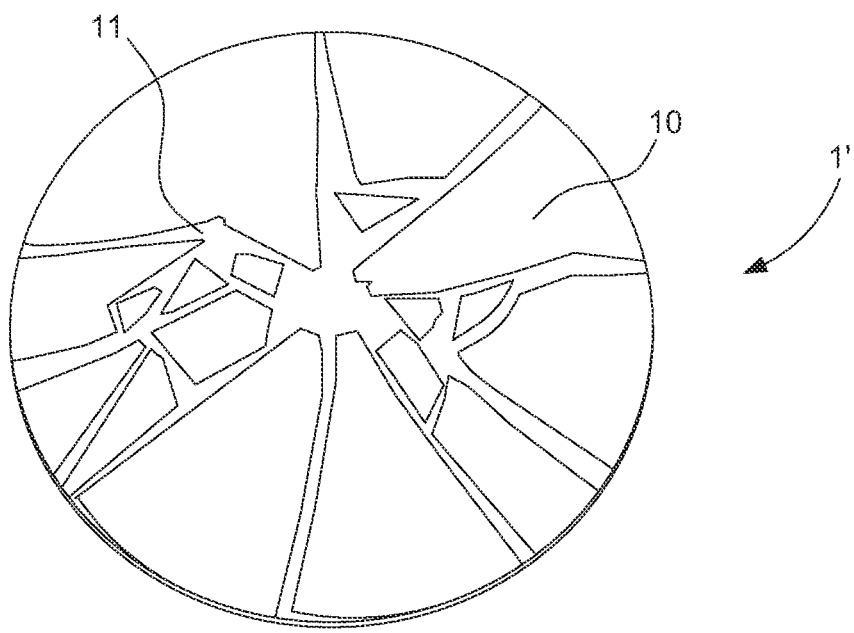

METHOD FOR MANUFACTURING A TIMEPIECE COMPONENT

TECHNICAL FIELD OF THE INVENTION

The present invention relates to a method for manufacturing a timepiece component. More precisely, the invention relates to a method for manufacturing a timepiece component (e.g. a dial) used in the field of horology or jewellery.

TECHNOLOGICAL BACKGROUND OF THE INVENTION

Many methods for manufacturing and decorating in relief on a surface of a mechanical part such as a watch dial are known in the prior art. A certain number of these known methods consist in manufacturing the decoration elements separately from the mechanical part to be decorated, then fastening these decoration elements on the mechanical part to which they are intended.

Another method for decorating a mechanical part such as a dial is known by the European patent application EP 2 370 865 A1 in the name of The Swatch Group Research and Development Ltd. This decoration method consists in:
providing the mechanical part to be decorated;
making a mask of the type of a plate the thickness of which is at least equal to the desired thickness of the decoration element and wherein are machined openings the contours of which correspond to the shape of the decoration elements sought;
positioning the mask on the surface to be decorated of the mechanical part, so that the openings of the mask coincide with the locations of the mechanical part intended to receive the decoration elements;
placing said at least one opening of the mask (4) against the place to be decorated in order to form at least one mould;
filling by injection said at least one mould with a metal material brought to a temperature at least higher than its vitreous transition temperature Tg and subsequently cooled so as to give this metal an amorphous structure to form the element;
removing the mask to reveal the decoration elements on the surface of the decorated mechanical part.

One advantage of this decoration method resides in its relative simplicity of implementation. Indeed, whereas in the case of many decoration methods, the decoration elements are made separately from the mechanical part to be decorated, then only subsequently fastened to this mechanical part, in the case where a mask is used, the decoration elements are made and fastened directly to the mechanical part to be decorated during the same step of the method, which makes it possible to save time.

One drawback of the decoration method by means of masks placed on the surface of the mechanical part to be decorated may nevertheless be seen in the fact that the risk cannot be excluded that the mask is not closely in contact with the surface to be decorated and that at the time of filling the various moulds, the filling material leaks a little over the surface of the mechanical part, which requires some of these mechanical parts to be scrapped. This is problematic in particular in the case where it is desired to decorate dials for timepieces, because such dials are expensive mechanical parts.

Also, another drawback of such a decoration method is that the complex geometrical shapes for decorating the dial are difficult to achieve and generally require very expensive manual work.

SUMMARY OF THE INVENTION

The aim of the present invention is to remedy the problems mentioned above as well as also others by proposing a method for manufacturing a watch dial that particularly prevents the decoration elements from being transferred on the surface of the dial. Another aim of the present invention is to provide a method for manufacturing a dial in which decoration elements are directly integrated into the body of the dial and form a monolithic element.

To this end, the present invention relates to a method for manufacturing a timepiece component comprising the successive steps of:
providing a timepiece component;
breaking the timepiece component into a plurality of pieces;
depositing the pieces on a support and creating a desired pattern to be reassembled, the pattern having interstices between the various pieces;
transferring the support into a mould adapted by hot forming and placing a preform on the pieces of the timepiece component;
heating to a temperature higher than the vitreous transition temperature of the preform and applying a force on the preform to fill the interstices and obtain a reassembled timepiece component;
cooling the whole below the vitreous transition temperature of the preform to form a reassembled timepiece component;
recovering the reassembled timepiece component and machining it to the required dimensions.

According to special embodiments, the method for manufacturing a timepiece component according to the invention is characterised in that:
the filling material is an amorphous metal or a partially amorphous metal;
the amorphous or partially amorphous metal is a platinum alloy, a palladium alloy or a zirconium alloy;
the material of the timepiece component is selected from materials having a melting temperature higher than the Tg of the amorphous metal (metals, ceramics, glass, sapphire, diamond, mother-of-pearl, silicon, precious and semi-precious stones, etc.)
the reassembled timepiece component is subjected to one at least of the following finishing operations: sanding, brushing, satin finishing, polishing, sunray brushing or laser matte finishing;
the timepiece component is selected from: a bezel, a back, a bridge, a plate, an oscillating mass or also an item of jewellery.

The invention also relates to a timepiece component obtained by implementing a manufacturing method in accordance with the invention.

BRIEF DESCRIPTION OF THE FIGURES

Other features and advantages of the present invention will become more apparent upon reading the following detailed description of one implementation of the method according to the invention, this example being given for purely illustrative and non-limiting purposes only in connection with the appended drawing wherein:

FIGS. 1 (a)-1 (f) show the various aspects of the manufacturing method, as follows:
FIG. 1 (a) shows the providing of the timepiece component,
FIG. 1 (b) shows the timepiece component broken into a plurality of pieces,
FIG. 1 (c) shows the broken timepiece components deposited on a support in a desired pattern,
FIG. 1 (d) shows the support transferred into a mould adapted by hot forming with a preform placed on the pieces of the timepiece component,
FIG. 1 (e) shows the heating of the mould with the base, the dial pieces and the preform and the applying of a force on the mould by a piston, and
FIG. 1 (f) shows the reassembled timepiece component; and
FIG. 2 is a top view of a watch dial obtained by implementing the manufacturing method according to the invention.

DETAILED DESCRIPTION OF AN EMBODIMENT OF THE INVENTION

In accordance with the invention, firstly a timepiece component is provided for step a) shown in FIG. 1(a). In the example illustrated in the figures, this timepiece component is a watch dial 1. Of course, this example is given for purely illustrative and non-limiting purposes, the manufactured timepiece component capable of being of any type such as a bezel, a back, a bridge, a plate, an oscillating mass or also an item of jewellery. The only restriction to which this timepiece component is subject is that it must be made of a material the mechanical properties of which are not modified in the range of temperatures involved by the method of the invention. In other words, the timepiece component must not deform, soften, or even melt during the decoration operations in accordance with the invention.

Once provided with a watch dial 1, the latter is broken into a plurality of pieces 10 during the following step b) shown in FIG. 1(b). This operation may be performed totally randomly to subsequently obtain unique patterns, or in a controlled way to obtain predetermined patterns.

According to one variant of the invention, pieces already broken such as waste or scraps may be used instead of the previously broken timepiece component.

The material used for the dial 1 may be a metal material such as steel, brass, aluminium or titanium but it may also be a so-called brittle material. Brittle material means a material that has no exploitable plastic deformation such as for example quartz, ruby, sapphire, glass, silicon, diamond, graphite, carbon or a ceramic such as silicon nitride and silicon carbide or a cermet-type composite. It is then understood that a part made from such a material is very brittle and may be broken easily.

The material forming the timepiece component 1 is selected from materials having a melting temperature higher than the Tg of the amorphous metal used subsequently in the method.

During step c) shown in FIG. 1(c), the pieces 10 of the dial 1 should be transferred on a support 2, such as a stake or a base, to create a desired pattern to be reassembled, the pattern having interstices 11 between the various pieces. The pieces 10 of the dial are dimensioned and positioned in relation to one another so that at least one interstice 11 appears. The interstices 11 are used so that another material can be inserted therein, the latter being used to act as a connecting and decoration element between the pieces of the dial 1.

Once the pieces 10 have been placed on the support 2, the latter is transferred into a mould adapted by hot forming and a metal preform 3 is placed on the dial pieces (step d) shown in FIG. 1(d).

According to the invention, the material used for the preform 3 and acting as a connecting element between the pieces 10 of the dial, is an amorphous or partially amorphous metal material.

It will be understood by partially amorphous material that the material is capable of solidifying at least partially during amorphous phase, that is to say that it is subjected to a temperature rise above its melting temperature enabling it to locally lose all crystalline structure, said rise being followed by cooling to a temperature lower than its vitreous transition temperature enabling it to become at least partially amorphous. This material may then be a metal alloy.

According to one variant of the invention, the preform 3 is manufactured by compacting a mixture of powders (already amorphous metal powder for example) by using, for example, pressing or hot extrusion between the vitreous transition temperature $T_g$ and the crystallisation temperature $T_x$.

During the following step e) shown in FIG. 1(e), the mould comprising the base 2, the dial pieces 10 and the preform 3 is heated to a temperature higher than the vitreous transition temperature of the preform 3 then a force F is applied on the preform 3 via a piston 4 to fill the interstices 11 and obtain a reassembled dial 1' shown in FIG. 1(f). This heating step consists in heating the whole to a temperature between the vitreous transition temperature $T_g$ and the crystallisation temperature $T_x$ of the preform. At this temperature, the amorphous metals have a viscosity that reduces significantly, the reduction of the viscosity being dependent on the temperature.

Once the preform 3 has reached the desired viscosity, the latter is pressed in such a way as to fill the interstices 11 between the dial 1 pieces as can be seen in FIG. 2. Obviously, the pressure exerted on the preform 3 depends on the metal or on the alloy used and on its vitreous transition temperature $T_g$.

Once the expansion of the preform 3 in the interstices 11 is achieved and the dial pieces 10 are linked to one another in their definitive position with the preform 3 filling the interstices 11, a cooling step is carried out. This cooling step is performed to set the preform 3 and form a reassembled dial 1' having an increased tenacity and a unique decorative pattern.

During the last step the reassembled dial 1' is subjected to one at least of the following finishing operations: sanding, brushing, satin finishing or polishing. The reassembled dial 1' may also be cut to the desired final dimensions or reworked at the rear face to adjust the thickness of the latter.

It goes without saying that the present invention is not limited to the embodiments that have just been described, and that miscellaneous modifications and simple variants may be envisaged by the person skilled in the art without departing from the scope of the invention as defined by the appended claims.

The invention claimed is:

1. A manufacturing method comprising the successive steps of:
   providing a timepiece component;
   breaking the timepiece component into a plurality of pieces such that the plurality of pieces are separated from each other along at least one virtual plane that intersects a front face of the timepiece component;

depositing the plurality of pieces on a support and creating a desired pattern to be reassembled, the pattern including interstices between the plurality of pieces of the timepiece component, and a shape of an entirety of a front face of the pattern is the same as a shape of an entirety of the front face of the timepiece component before the breaking the timepiece component;

transferring the support into a mold adapted by hot forming and placing a preform on the plurality of pieces of the timepiece component, the mold, the support, the plurality of pieces and the preform forming an assembly;

heating the assembly to a temperature higher than a vitreous transition temperature of the preform and applying a force on the preform to fill the interstices; and forming a reassembled timepiece component by cooling the assembly below the vitreous transition temperature of the preform, wherein a shape of an entirety of a front face of the reassembled timepiece component is the same as the shape of the entirety of the front face of the timepiece component before the breaking the timepiece component, wherein the timepiece component is a bezel of a watch, a back of the watch, a bridge of the watch, a plate of the watch, an oscillating mass of the watch, or a watch dial of the watch.

2. The manufacturing method according to claim 1, wherein the preform is made of an amorphous metal or a partially amorphous metal.

3. The manufacturing method according to claim 2, wherein the amorphous or partially amorphous metal is a platinum alloy, a palladium alloy, a zirconium alloy, a gold alloy, or a silver alloy.

4. The manufacturing method according to claim 1, wherein the timepiece component is formed from a material having a melting temperature higher than the vitreous transition temperature of the preform, and wherein the material includes at least one from among metals, ceramics, glass, sapphire, diamond, mother-of-pearl, silicon, and precious and semi-precious stones.

5. The manufacturing method according to claim 1, further comprising subjecting the reassembled timepiece component to at least one of the following finishing operations: sanding, brushing, sunray brushing, satin finishing, polishing, and laser matte finishing.

6. The manufacturing method according to claim 1, wherein the timepiece component is the bezel of the watch.

7. The manufacturing method according to claim 1, wherein the timepiece component is the watch dial of the watch.

8. The manufacturing method according to claim 1, wherein the timepiece component is the back of the watch.

9. The manufacturing method according to claim 1, wherein the timepiece component is the plate of the watch.

10. The manufacturing method according to claim 1, wherein the timepiece component is the oscillating mass of the watch.

11. The manufacturing method according to claim 1, further comprising machining the reassembled timepiece component to chosen dimensions.

* * * * *